March 27, 1951     F. W. COFFING     2,546,387
DETACHABLE HANDLE LOCK
Filed March 12, 1947
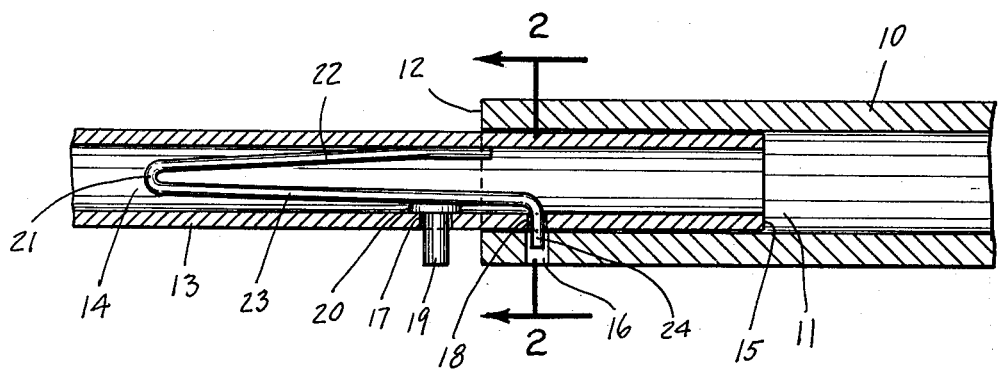
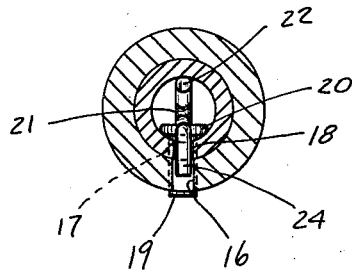
Inventor
FREDRICK W. COFFING.
By Lockwood, Goldsmith & Galt.
Attorneys.

Patented Mar. 27, 1951

2,546,387

UNITED STATES PATENT OFFICE 2,546,387

DETACHABLE HANDLE LOCK

Fredrick W. Coffing, Danville, Ill.

Application March 12, 1947, Serial No. 734,048

3 Claims. (Cl. 279—79)

This invention relates to the locking of an extensible handle.

The chief object of this invention is to provide a socketed extension for a socketed handle, the two having telescopic association, and have same, when associated together, positively locked together.

Herein the handle and extension by way of example only are illustrated as tubular and the latter has an exterior slightly less than and complementary to the interior of the former. In the specific example shown these parts are cylindrical.

The chief feature of the present invention resides in incorporating in the received member of two socket provided telescopic associated members an external controllable positive lock whereby the member may be locked together or unlocked.

Other objects and features of the invention will be set forth more fully hereinafter.

The full nature of the invention will be understood from the accompanying drawings and the following description and claims.

In the drawings:

Fig. 1 is a longitudinal central sectional view through a locked embodiment of the invention.

Fig. 2 is a transverse sectional view taken on line 2—2 of Fig. 1 and in the direction of the arrows.

In the drawings 10 indicates a handle having a socket 11 in the end 12. In the present instance the handle is tubular and cylindrical.

The extension 13 has a socket 14 in the confronting end 15. The extension adjacent end is similar to the adjacent handle end. One telescopes into the other for an appreciable distance as shown in Fig. 1 and the exterior of the extension is complementary to and slightly smaller than the interior of the handle.

The handle 10 near end 12 includes lateral opening 16. The extension 13 includes two longitudinally disposed parallel holes 17 and 18. In the former is seated the shank portion 19 of a finger piece having interiorly disposed head 20.

A return bend spring having intermediate portion 21, free arm 22, and opposed arm 23 is seated in the socket portion of the extension and the lateral, outwardly directed end or tooth 24 is seated in opening 18. Arm 23 rides upon head 20 to retain the finger piece in position.

Tooth 24 is normally constrained outwardly by the spring so the latter cannot escape from the extension. In construction the finger piece is normally applied to the extension at 15 and moved toward opening 17 until shank 19 drops into the same and head 20 bears upon the extension interior. Shank 19 being larger than hole 18 cannot drop into same.

The spring 21 is presented bend first and to end 15 of the extension 13. The end 24 is then moved laterally until it enters the extension socket at end 15. The end 24 then passes inwardly with the spring until the free end or tooth 24 registers with the hole 18 whereupon it springs outwardly. At this time arm 23 lies over head 20.

When it is desired to effect locked connection of handle and extension the two are telescopically associated by initially presenting same together until tooth 24 engages end 12. Thereupon the handle and extension are rotated relatively until seat or hole 16, tooth 24, and shank 19 are in longitudinal alignment. When this is effected finger piece 19—20 is depressed to sufficiently retract tooth 24 to permit further telescopic association of the handle and extension. When the handle and extension are sufficiently telescoped the tooth 24 will enter into the hole seat 16 and thus lock the handle and extension against longitudinal and/or rotative relative movement. Separation is effected by merely pressing inwardly on shank 19 and pulling the then released members apart.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A separable and lockable extension and handle comprising a pair of longitudinally alignable, readily separable members having confronting socketed adjacent ends, the larger socket member having a transversely disposed locking seat opening inwardly near the mouth of the larger socket, the latter telescopically receiving the member having the smaller socket, the latter member having a transversely disposed opening near the mouth of its socket, a transversely disposed tooth in the transverse opening in the member having the smaller socket and normally constrained to projecting position for seating in the larger socket seat, a U-shaped spring member providing the said constraint and vested in the smaller socket, and manually operable means independent of said spring and having a portion exteriorly exposed relative to the smaller socket including member for manual operation and an interior portion arranged to engage the spring and to retract said tooth from projecting position in opposition to said spring, said spring normally retaining said independent operable means upon the smaller socket including member.

2. Structure as defined by claim 1 wherein the tooth comprises an extension of the spring turned at right angles to one leg of the spring and extending radially outwardly.

3. Structure as defined by claim 2 wherein the said manually operable means comprises a headed member having a shank extending through an opening in the smaller member, the head portion being disposed immediately contiguous to that arm of the spring member to which the tooth is attached, the spring and tooth being normally separable from the smaller socket including member when the tooth is fully retracted into the socket of that member.

FREDRICK W. COFFING.

REFERENCES CITED

The following references are of record in the file of this patent:

UNITED STATES PATENTS

| Number | Name | Date |
|---|---|---|
| 373,825 | Gleich et al. | Nov. 29, 1887 |
| 795,717 | Morrow | July 25, 1905 |
| 798,325 | Daddysmon | Aug. 29, 1905 |
| 1,007,322 | Barnes | Oct. 31, 1911 |
| 1,792,121 | Pieper | Feb. 10, 1931 |
| 2,105,330 | Pagenkopf | Jan. 11, 1938 |